US009210531B1

(12) United States Patent
Vu

(10) Patent No.: US 9,210,531 B1
(45) Date of Patent: *Dec. 8, 2015

(54) SERVER FOR WIRELESS APPLICATION SERVICE SYSTEM

(71) Applicant: Marvell International Ltd., Hamilton (BM)

(72) Inventor: Chuong Vu, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 218 days.

This patent is subject to a terminal disclaimer.

(21) Appl. No.: 13/968,933

(22) Filed: Aug. 16, 2013

Related U.S. Application Data

(63) Continuation of application No. 13/568,617, filed on Aug. 7, 2012, now Pat. No. 8,515,403, which is a continuation of application No. 11/821,482, filed on Jun. 23, 2007, now Pat. No. 8,238,889.

(60) Provisional application No. 60/910,947, filed on Apr. 10, 2007.

(51) Int. Cl.
*H04W 4/00* (2009.01)
(52) U.S. Cl.
CPC ..................................... *H04W 4/003* (2013.01)
(58) Field of Classification Search
CPC ................................................... H04W 80/04
USPC ......................................................... 370/328
See application file for complete search history.

(56) References Cited

U.S. PATENT DOCUMENTS

| 7,130,622 | B2 | 10/2006 | Vanska et al. |
| 7,668,129 | B2 | 2/2010 | Alon et al. |
| 7,778,593 | B2 | 8/2010 | Hsu et al. |
| 8,515,403 | B1 * | 8/2013 | Vu .............................. 455/414.3 |
| 2002/0065728 | A1 | 5/2002 | Ogasawara |
| 2007/0032266 | A1 | 2/2007 | Feher |

(Continued)

OTHER PUBLICATIONS

ANSI/IEEE Std 802.11, 1999 Edition; Information technology—Telecommunications and; information exchange between systems—Local and metropolitan area networks—Specific; requirements—Part 11: Wireless LAN Medium Access Control (MAC) and Physical Layer; (PHY) Specifications; LAN/MAN Standards Committee of the IEEE Computer Society; 528; pages.

(Continued)

*Primary Examiner* — Anh-Vu Ly
*Assistant Examiner* — Abdullahi Ahmed

(57) ABSTRACT

A wireless client device includes a receiver, controller, and transmitter. The receiver is configured to wirelessly receive a beacon from a wireless access point. The beacon includes an information element indicating whether the wireless access point is capable of providing a wireless application service. The controller is configured to, in response to the information element indicating that the wireless access point is capable of providing a wireless application service, generate a wireless application service request. The wireless application service request identifies a requested wireless application service, and identifies a source of an application to be obtained, installed, and executed by the wireless access point. Execution of the application enables the wireless access point to provide the requested wireless application service to the wireless client device. The transmitter is configured to wirelessly transmit a packet to the wireless access point. The packet includes the wireless application service request.

20 Claims, 7 Drawing Sheets

(56) References Cited

U.S. PATENT DOCUMENTS

| | | | |
|---|---|---|---|
| 2007/0087682 | A1 | 4/2007 | DaCosta |
| 2007/0130456 | A1 | 6/2007 | Kuo et al. |
| 2007/0165625 | A1* | 7/2007 | Eisner et al. .................. 370/389 |
| 2007/0213029 | A1 | 9/2007 | Edney et al. |
| 2007/0242645 | A1 | 10/2007 | Stephenson et al. |
| 2007/0297438 | A1 | 12/2007 | Meylan et al. |
| 2008/0049703 | A1 | 2/2008 | Kneckt et al. |
| 2008/0119174 | A1 | 5/2008 | Farkas et al. |
| 2008/0146160 | A1 | 6/2008 | Jiang et al. |
| 2009/0046682 | A1 | 2/2009 | Kim et al. |
| 2009/0143080 | A1 | 6/2009 | Brede et al. |
| 2014/0098671 | A1* | 4/2014 | Raleigh et al. ................ 370/235 |

OTHER PUBLICATIONS

IEEE Std 802.11a-1999 (Supplement to IEEE Std 802.11-1999) Adopted by ISO/IEC and; redesignated as ISO/IEC 8802-11: 1999/Amd 1 :2000(E)); Supplement to IEEE Standard; for Information technology—Telecommunications and information exchange between; systems—Local and metropolitan area networks—Specific requirements—Part 11: Wireless; LAN Medium Access Control (MAC) and Physical Layer (PHY) specifications High-speed; Physical Layer in the 5 GHz Band; LAN/MAN Standards Committee of the IEEE Computer; Society; 91 pages.

IEEE Std 802.11 b-1999 (Supplement to IEEE Std 802.11-1999 Edition); Supplement to; IEEE Standard for Information technology—Telecommunications and information exchange; between systems—Local and metropolitan area networks—Specific requirements—Part 11:; Wireless LAN Medium Access Control (MAC) and Physical Layer (PHY) specifications; Higher-Speed Physical Layer Extension in the 2.4 GHz Band; LAN/MAN Standards; Committee of the IEEE Computer Society; Sep. 16, 1999 IEEE-SA Standards Board;; 96 pages.

IEEE Std 802.11b-1999/Cor 1-2001 (Corrigendum to IEEE Std 802. 11-1999); IEEE; Standard for Information technology—Telecommunications and information exchange; between systems—Local and metropolitan area networks—Specific requirements—Part 11:; Wireless LAN Medium Access Control (MAC) and Physical Layer (PHY) specifications; Amendment 2: Higher-Speed Physical Layer (PHY) extension in the 2.4 GHz Band -; Corrigendum 1; LAN/MAN Standards Committee of the IEEE Computer Society; Nov. 7, 2001; 24 pages.

IEEE P802.11e/D11.0, Oct. 2004 (Amendment to ANSI/IEEE Std 802.11-1999 (2003; Reaff) edition as amended by IEEE Std 802.11 g-2003, IEEE Std 802.11 h-2003 and IEEE; 802.11 i-2004); IEEE Standard for Information technology—Telecommunications and; information exchange between systems—Local and metropolitan area networks—Specific; requirements—Part 11: Wireless Medium Access Control (MAC) and Physical Layer (PHY); specifications Amendment 7: Medium Access Control (MAC) Quality of Service (QoS); Enhancements; Sponsor LAN/MAN Standards Committee of the IEEE Computer Society;; 185 pages.

IEEE P802.11e/D13.0, Jan. 2005 (Amendment to ANSI/IEEE Std 802.11-1999 (2003; Reaff) edition as amended by IEEE Std 802.11 g-2003, IEEE Std 802.11 h-2003 and IEEE; 802.11 i-2004 and IEEE 802.11j-2004); IEEE Standard for Information technology-; Telecommunications and information exchange between systems—Local and metropolitan; area networks—Specific requirements—Part 11: Wireless LAN Medium Access Control; (MAC) and Physical Layer (PHY) specifications Amendment : Medium Access Control; (MAC) Quality of Service (QoS) Enhancements; Sponsor LAN/MAN Standards Committee; of the IEEE Computer Society; 185 pages.

IEEE P802.11 g/D8.2, Apr. 2003 (Supplement to ANSI/IEEE Std 802.11-1999(Reaff 2003));; Draft Supplement to Standard [for] Information Technology—Telecommunications; and information exchange between systems—Local and metropolitan area networks-; Specific requirements—Part 11: Wireless LAN Medium Access Control (MAC) and Physical; Layer (PHY) specifications: Further Higher Data Rate Extension in the 2.4 GHz Band;; LAN/MAN Standards Committee of the IEEE Computer Society; 69 pages.

IEEE P802.11i!D10.0, Apr. 2004 (Amendment to ANSI/IEEE Std 802.11-1999 (2003 Reaff); edition as amended by IEEE Std 802.11g-2003 and IEEE Std 802.11 h-2003)—IEEE; Standard for Information technology—Telecommunications and information exhange; between systems—Local and metropolitan area networks—Specific requirements. Part 11:; Wireless Medium Access Control (MAC) and Physical layer (PHY) specifications:; Amendment 6: Medium Access Control (MAC) SecurilJ' Enhancements. 184 pages.

IEEE P802.11 k/01 0.0, Nov. 2007; IEEE Standard for Information technology-; Telecommunications and information exhange between systems—Local and metropolitan; area networks—Specific requirements. Part 11: Wireless LAN Medium Access Control; (MAC) and Physical layer (PHY) specifications Amendment 1: Radio Resource; Measurement of Wireless LAN's; 223 pages.

802.11 n; IEEE P802.11-04/0889r6; Wireless LANs, TGn Sync Proposal Technical; Specification; 131 pages.

IEEE P802.11 v/01.02, Sep. 2007; IEEE Standard for Information technology -; Telecommunications and information exhange between systems—Local and metropolitan; area networks—Specific requirements—Part 11: Wireless LAN Medium Access Control; (MAC) and Physical layer (PHY) specifications: Amendment 8: Wireless Network; Management; 204 pages.

IEEE P802.11w/D4.0, Nov. 2007; IEEE Standard for Information technology-; Telecommunications and information exhange between systems—Local and metropolitan; area networks—Specific requirements—Part 11: Wireless LAN Medium Access Control; (MAC) and Physical layer (PHY) specifications: Amendment 5: Protected Management; Frames; 55 pages.

* cited by examiner

FIG. 6

| DA 602 | SA 604 | Len. 606 | 0xAA 608 | 0xAA 610 | 0x03 612 | WAP OUI 614 | Frame Type 616 | Vendor OUI 618 | Vendor Port Number 620 | TLV List 622 | FCS 624 |
|---|---|---|---|---|---|---|---|---|---|---|---|
| 6 | 6 | 2 | 1 | 1 | 1 | 3 | 2 | 3 | 2 | Var. | 2 |

Bytes (↑ 600)

FIG. 7

| DA 702 | SA 704 | Len. 706 | 0xAA 708 | 0xAA 710 | 0x03 712 | WAP OUI 714 | Frame Type 716 | Vendor OUI 718 | Vendor Port Number 720 | Security Cert. 722 | FCS 724 |
|---|---|---|---|---|---|---|---|---|---|---|---|
| 7 | 7 | 2 | 1 | 1 | 1 | 3 | 2 | 3 | 2 | Var. | 2 |

Bytes (↑ 700)

FIG. 8

| DA 802 | SA 804 | Len. 806 | 0xAA 808 | 0xAA 810 | 0x03 812 | WAP OUI 814 | Frame Type 816 | Vendor OUI 818 | Vendor Port Number 820 | Auth. Result 822 | FCS 824 |
|---|---|---|---|---|---|---|---|---|---|---|---|
| 8 | 8 | 2 | 1 | 1 | 1 | 3 | 2 | 3 | 2 | Var. | 2 |

Bytes (↑ 800)

SERVER FOR WIRELESS APPLICATION SERVICE SYSTEM

CROSS-REFERENCE TO RELATED APPLICATIONS

This is a continuation of U.S. patent application Ser. No. 13/568,617, filed on Aug. 7, 2012, which is a continuation of U.S. patent application Ser. No. 11/821,482 (now U.S. Pat. No. 8,238,889), filed on Jun. 23, 2007, which claims the benefit of U.S. Provisional Patent Application No. 60/910,947, filed on Apr. 10, 2007. The entire disclosures of the above applications are incorporated by reference herein.

BACKGROUND

The present invention relates generally to data communications. More particularly, the present invention relates to a wireless application service system.

SUMMARY

In general, in one aspect, the invention features an apparatus comprising: a first network interface comprising a transmitter to wirelessly transmit a beacon comprising an indication of the capability of the apparatus to provide wireless application services; a receiver to wirelessly receive a wireless application service request from a wireless client, the wireless application service request comprising a request for one of the wireless application services, and an identifier of a service access point for the requested wireless application service; a second network interface to obtain an application for the requested wireless application service from the service access point in response to the wireless application service request; and a processor to execute the application, wherein the application provides the requested wireless application service to the wireless client.

Some embodiments comprise a wireless access point comprising the apparatus. In some embodiments, the wireless access point is compliant with all or part of IEEE standard 802.11, including draft and approved amendments 802.11a, 802.11b, 802.11e, 802.11g, 802.11i, 802.11k, 802.11n, 802.11v, and 802.11w. Some embodiments comprise a memory to store data for the application. In some embodiments, the wireless application service request further comprises one or more of: a class-of-device identifier for the wireless client; a vendor identifier for the wireless client; and a capabilities identifier for the wireless client. In some embodiments, the processor determines whether the wireless application service request is to be granted; and wherein the transmitter wirelessly transmits a wireless application service request response to the wireless client indicating whether the wireless application service request is granted. In some embodiments, the receiver wirelessly receives an authentication request from the wireless client; wherein the processor generates an authentication result based on the authentication request; and wherein the transmitter wirelessly transmits an authentication response to the wireless client, the authentication response representing the authentication result. Some embodiments comprise a user interface comprising an authentication device to authenticate a user of the user interface. In some embodiments, the authentication device comprises: a fingerprint reader.

In general, in one aspect, the invention features a method comprising: wirelessly transmitting, from an apparatus, a beacon comprising an indication of the capability of the apparatus to provide wireless application services; wirelessly receiving a wireless application service request from a wireless client, the wireless application service request comprising a request for one of the wireless application services, and an identifier of a service access point for the requested wireless application service; obtaining an application for the requested wireless application service from the service access point in response to the wireless application service request; and executing the application, wherein the application provides the requested wireless application service to the wireless client.

In some embodiments, a wireless access point comprises the apparatus. In some embodiments, the wireless access point is compliant with all or part of IEEE standard 802.11, including draft and approved amendments 802.11a, 802.11b, 802.11e, 802.11g, 802.11i, 802.11k, 802.11n, 802.11v, and 802.11w. Some embodiments comprise storing data in the apparatus for the application. In some embodiments, the wireless application service request further comprises one or more of: a class-of-device identifier for the wireless client; a vendor identifier for the wireless client; and a capabilities identifier for the wireless client. Some embodiments comprise determining whether the wireless application service request is to be granted; and wirelessly transmitting a wireless application service request response to the wireless client indicating whether the wireless application service request is granted. Some embodiments comprise wirelessly receiving an authentication request from the wireless client; generating an authentication result based on the authentication request; and wirelessly transmitting an authentication response to the wireless client, the authentication response representing the authentication result.

In general, in one aspect, the invention features a computer-readable media embodying instructions executable by a computer to perform a method comprising: causing wireless transmission, from an apparatus, of a beacon comprising an indication of the capability of the apparatus to provide wireless application services, wherein the apparatus wirelessly receives a wireless application service request from a wireless client, the wireless application service request comprising a request for one of the wireless application services, and an identifier of a service access point for the requested wireless application service; obtaining an application for the requested wireless application service from the service access point in response to the wireless application service request; and executing the application, wherein the application provides the requested wireless application service to the wireless client.

In some embodiments, a wireless access point comprises the apparatus. In some embodiments, the wireless access point is compliant with all or part of IEEE standard 802.11, including draft and approved amendments 802.11a, 802.11b, 802.11e, 802.11g, 802.11i, 802.11k, 802.11n, 802.11v, and 802.11w. In some embodiments, the method further comprises: storing data in the apparatus for the application. In some embodiments, the wireless application service request further comprises one or more of: a class-of-device identifier for the wireless client; a vendor identifier for the wireless client; and a capabilities identifier for the wireless client. In some embodiments, the method further comprises: determining whether the wireless application service request is to be granted; and causing wireless transmission of a wireless application service request response to the wireless client indicating whether the wireless application service request is granted. In some embodiments, the method further comprises: generating an authentication result based on an authentication request wirelessly received from the wireless client; and causing wireless transmission of an authentication response to the wireless client, the authentication response representing the authentication result.

In general, in one aspect, the invention features an apparatus comprising: means for wirelessly transmitting a beacon comprising an indication of the capability of the apparatus to provide wireless application services; means for wirelessly receiving a wireless application service request from a wireless client, the wireless application service request comprising a request for one of the wireless application services, and an identifier of a service access point for the requested wireless application service; means for obtaining an application for the requested wireless application service from the service access point in response to the wireless application service request; and means for executing the application, wherein the application provides the requested wireless application service to the wireless client.

Some embodiments comprise a wireless access point comprising the apparatus. In some embodiments, the wireless access point is compliant with all or part of IEEE standard 802.11, including draft and approved amendments 802.11a, 802.11b, 802.11e, 802.11g, 802.11i, 802.11k, 802.11n, 802.11v, and 802.11w. Some embodiments comprise means for storing data for the application. In some embodiments, the wireless application service request further comprises one or more of: a class-of-device identifier for the wireless client; a vendor identifier for the wireless client; and a capabilities identifier for the wireless client. In some embodiments, the means for executing determines whether the wireless application service request is to be granted; and wherein the means for wirelessly transmitting transmits a wireless application service request response to the wireless client indicating whether the wireless application service request is granted. In some embodiments, the means for receiving wirelessly receives an authentication request from the wireless client; wherein the means for executing generates an authentication result based on the authentication request; and wherein means for wirelessly transmitting wirelessly transmits an authentication response to the wireless client, the authentication response representing the authentication result. Some embodiments comprise means for authenticating a user of the apparatus.

The details of one or more implementations are set forth in the accompanying drawings and the description below. Other features will be apparent from the description and drawings, and from the claims.

BRIEF DESCRIPTION OF DRAWINGS

FIG. 6 shows the format of a wireless application service request response according to some embodiments of the present invention.

FIG. 7 shows the format of an authentication request according to some embodiments of the present invention.

FIG. 8 shows the format of an authentication response according to some embodiments of the present invention.

Figure 1:
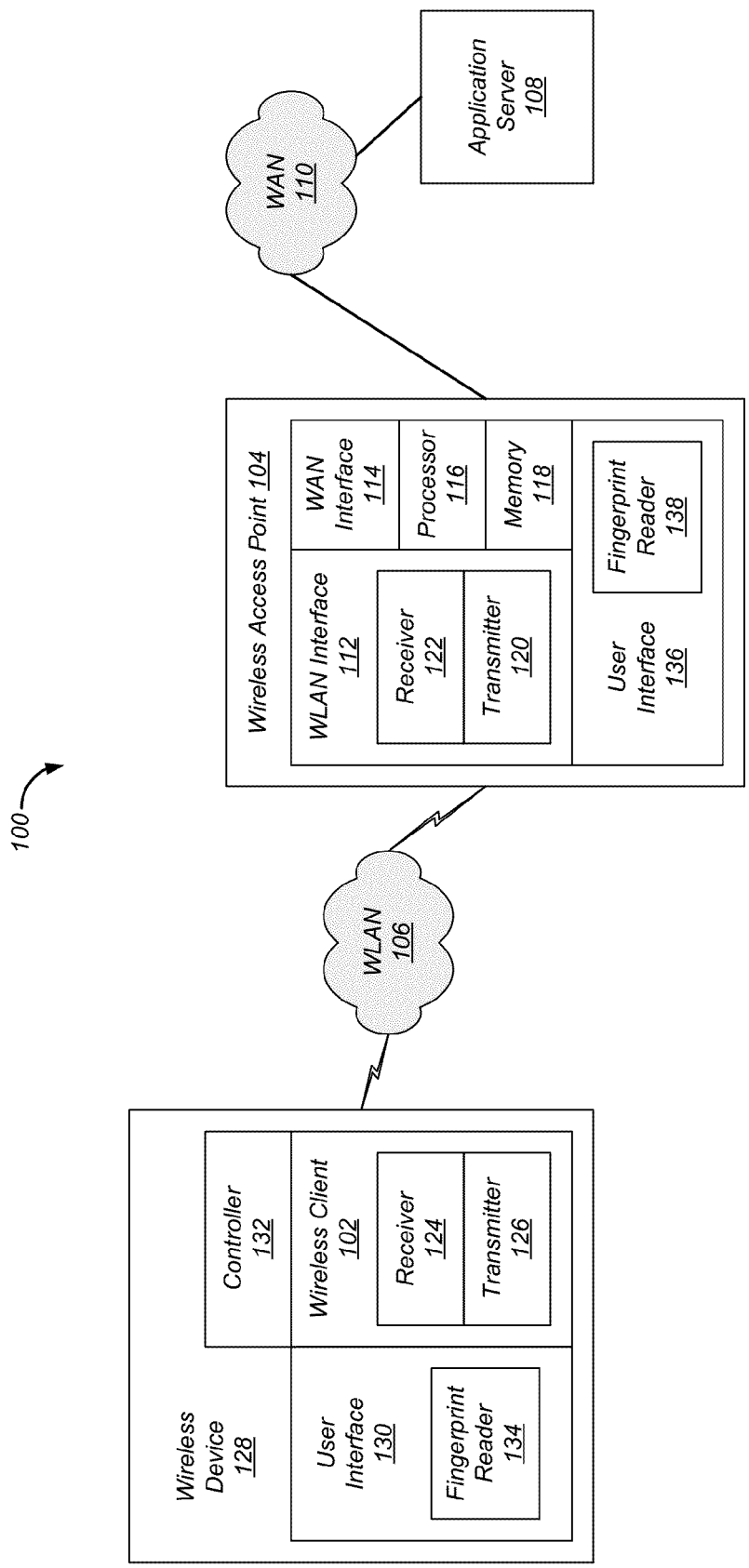
FIG. 1 shows a wireless application service system according to embodiments of the present invention.

The leading digit(s) of each reference numeral used in this specification indicates the number of the drawing in which the reference numeral first appears.

DESCRIPTION

As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices. Furthermore, while some embodiments of the present invention are described with reference to a client-server paradigm, other embodiments employ other paradigms, such as peer-to-peer paradigms and the like.

Embodiments of the present invention provide a wireless application service system. The wireless application service system can include a wireless client to request wireless application services and a wireless access point to advertise and provide wireless application services. For example, a television remote control can include the wireless client. When the remote control detects an advertisement for a television guide service, the remote control can request the television guide service. The wireless access point obtains a television guide application from a service access point specified by the request, and executes the application, which provides the television guide service wirelessly to the remote control.

In some embodiments, a wireless client wirelessly receives advertisements for one or more wireless application services. For example, a beacon transmitted by a wireless access point can include an indication of the capability of the wireless access point to provide wireless application services. The wireless client can wirelessly transmit a request to the wireless access point for one of the wireless application services. The request can include an identifier of a service access point for the requested wireless application service.

In response, the wireless access point obtains an application for the wireless application service from the service access point and executes the application. The application provides the wireless application service to the wireless client. In some embodiments, the wireless client must be authenticated by the wireless access point before the wireless application service is provided.

FIG. 1 shows a wireless application service system 100 according to embodiments of the present invention. Although in the described embodiments, the elements of wireless application service system 100 are presented in one arrangement, other embodiments may feature other arrangements, as will be apparent to one skilled in the relevant arts based on the disclosure and teachings provided herein. For example, the elements of wireless application service system 100 can be implemented in hardware, software, or combinations thereof.

Referring to FIG. 1, wireless application service system 100 includes a wireless device 128 comprising a wireless client 102 in communication a with a wireless access point 104 over a wireless local-area network (WLAN) 106. In some embodiments, WLAN 106 is compliant with all or part of IEEE standard 802.11, including draft and approved amendments such as 802.11a, 802.11b, 802.11e, 802.11g, 802.11i, 802.11k, 802.11n, 802.11v, and 802.11w. However, while embodiments of the present invention are described in terms of wireless access points 104 and wireless clients 102, other sorts of wireless network devices can be used instead. Furthermore, while embodiments of the present invention are described in terms of a WLAN 106, other sorts of wireless networks can be used instead.

Wireless application service system 100 also includes an application server 108 in communication with wireless access point 104 over a wide-area network (WAN) 110. However, while embodiments of the present invention are described in terms of a WAN 110, other sorts of networks can be used instead.

Referring again to FIG. 1, wireless access point 104 includes a WLAN interface 112, a WAN interface 114, a processor 116, and a memory 118. WLAN interface 112 includes a transmitter 120 and a receiver 122. Wireless access point 104 can also include a user interface 136 including a fingerprint reader 138 or other authentication device, for example to enter fingerprints of users. The fingerprints can then be used to authenticate users when they employ wireless device 128 to respond to authentication challenges issued by wireless access point 104, as described below. In some embodiments, WAN interface 114 is compliant with all or part of IEEE standard 802.11, including draft and approved amendments such as 802.11a, 802.11b, 802.11e, 802.11g, 802.11i, 802.11k, 802.11n, 802.11v, and 802.11w.

Wireless device 128 includes a user interface 130, a controller 132, and wireless client 102. Wireless client 102 includes a receiver 124 and a transmitter 126. In some embodiments, receiver 124 and transmitter 126 are compliant with all or part of IEEE standard 802.11, including draft and approved amendments such as 802.11a, 802.11b, 802.11e, 802.11g, 802.11i, 802.11k, 802.11n, 802.11v, and 802.11w.

Figure 2:
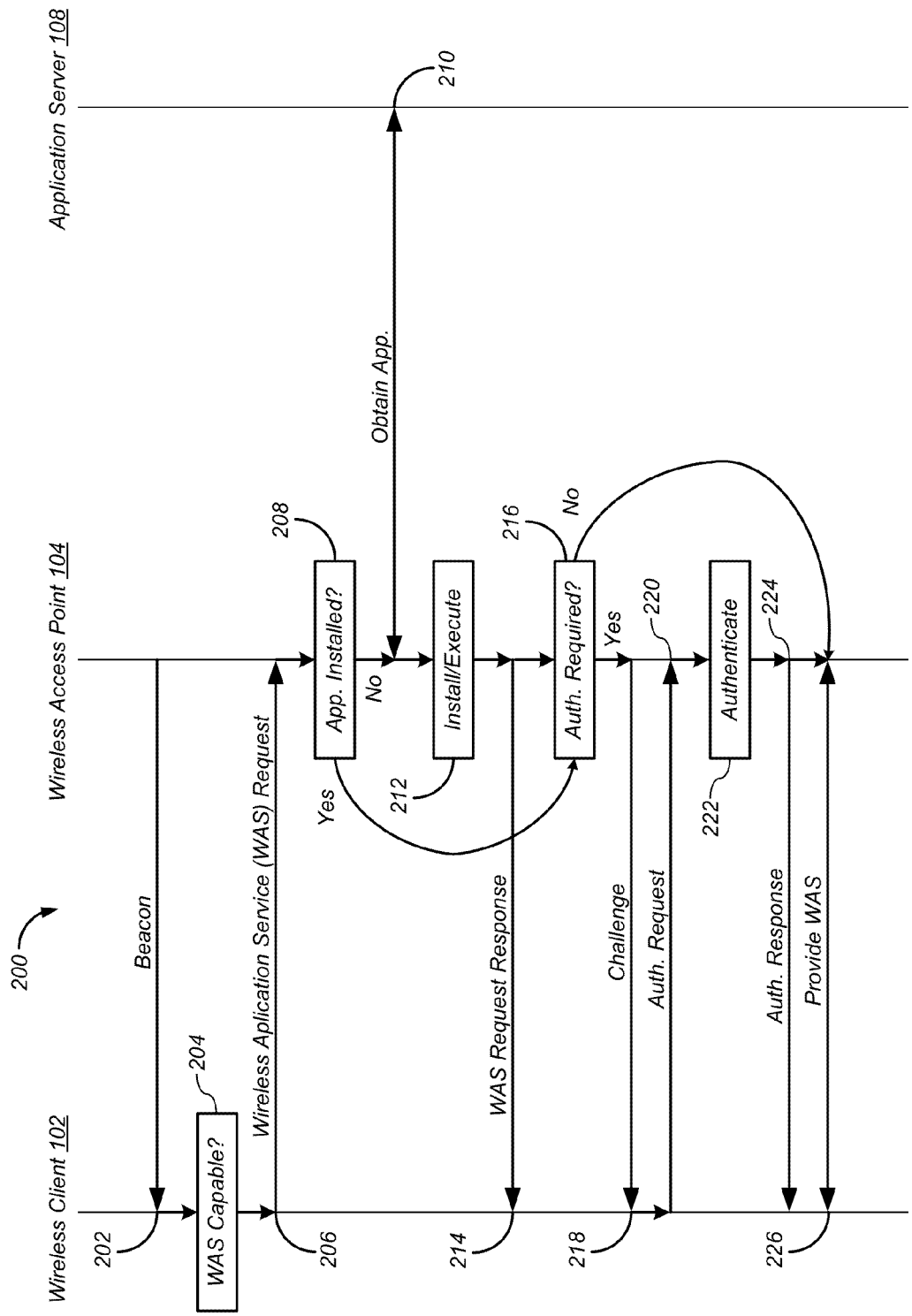
FIG. 2 shows a process for the wireless application service system of FIG. 1 according to some embodiments of the present invention.

FIG. 2 shows a process 200 for wireless application service system 100 of FIG. 1 according to some embodiments of the present invention. Although in the described embodiments, the elements of process 200 are presented in one arrangement, other embodiments may feature other arrangements, as will be apparent to one skilled in the relevant arts based on the disclosure and teachings provided herein.

Referring to FIG. 2, transmitter 120 of WLAN interface 112 of wireless access point 104 transmits wireless beacon signals (step 202). Each beacon signal can include one or more information elements (IE). In some embodiments, the beacon signals and information elements are compliant with all or part of IEEE standard 802.11, including draft and approved amendments such as 802.11a, 802.11b, 802.11e, 802.11g, 802.11i, 802.11k, 802.11n, 802.11v, and 802.11w.

Figure 3:
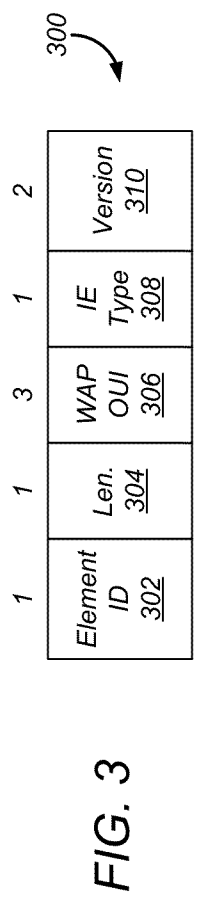
FIG. 3 shows the format of an information element (IE) according to some embodiments of the present invention.

FIG. 3 shows the format of an information element (IE) 300 according to some embodiments of the present invention. IE 300 begins with a one-byte Element ID 302 that can be used to identify a manufacturer of wireless access point 104. Element ID 302 is followed by a one-byte length field 304 that identifies the length of IE 302, a three-byte WAP Organizationally Unique Identifier (OUI) 306 representing a manufacturer of wireless access point 104, a one-byte proprietary IE Type 308, and a two-byte version field 310.

In some embodiments, Element ID 302 is used to advertise wireless application services. That is, the value of Element ID 302 provides an indication of the capability of wireless access point 104 to provide wireless application services. Referring again to FIG. 2, receiver 124 of wireless client 102 receives the beacon signal, and determines whether wireless access point 104 is capable of providing wireless application services (step 204), for example by examining the value of Element ID 302 in the beacon signal.

If wireless client 102 determines that wireless access point 104 is capable of providing wireless application services (step 204), transmitter 126 of wireless client 102 can transmit a wireless application service request to wireless access point 104 (step 206). Controller 132 generates a packet representing the wireless application service request, and transmitter 126 transmits a wireless signal representing the packet.

Figure 4:
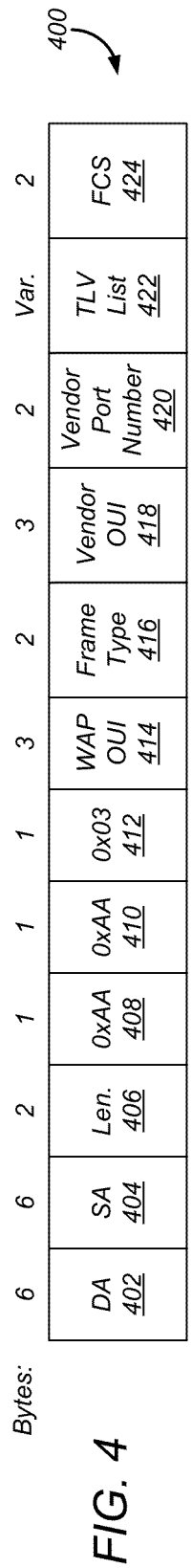
FIG. 4 shows the format of a wireless application service request according to some embodiments of the present invention.

FIG. 4 shows the format of a wireless application service request 400 according to some embodiments of the present invention. Wireless application service request 400 begins with a six-byte destination address (DA) 402 that includes the address of wireless access point 104, followed by a six-byte source address (SA) 404 that includes the address of wireless client 102. Wireless application service request 400 also includes a two-byte length field (Len.) 406, a 3-byte IEEE 802.2 Logical Link Control (LLC) portion including a one-byte field 408 comprising the value 0xAA, another one-byte field 410 comprising the value 0xAA, and a one-byte field 412 comprising the value 0x03, a three-byte WAP OUI 414 representing a manufacturer of wireless access point 104, a two-byte field 416 comprising a frame type (which can have a value of 0x0001 for a wireless application service request 400), an identifier of a service access point for the wireless application service including a three-byte Vendor OUI 418 of a vendor of the application(s) that provides the requested wireless application service(s) and a two-byte vendor port number 420 of a port where the application is available, a variable-length list 422 of one or more Tag Length Value (TLV) fields each representing one of the requested wireless application services, and a two-byte frame check sequence (FCS) 424. Other embodiments can include the same and/or different fields of the same or different lengths in the same or different order.

Figure 5:
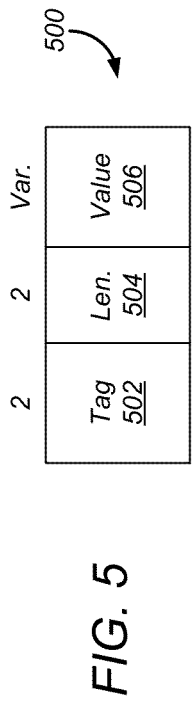
FIG. 5 shows the format of a TLV field according to some embodiments of the present invention.

FIG. 5 shows the format of a TLV field 500 according to some embodiments of the present invention. TLV field 500 includes a 2-byte tag 502, a two-byte length 504 representing a length of TLV field 500, and a variable value 506 representing a requested wireless application service. Variable value 506 can also represent one or more of the following: a class-of-device identifier for wireless client 102, a vendor identifier for wireless client 102, and a capabilities identifier for wireless client 102. Other embodiments can include the same and/or different fields of the same or different lengths in the same or different order.

Referring again to FIG. 2, receiver 122 of wireless access point 104 receives the wireless application service request. In response to the wireless application service request, wireless access point 104 determines whether the application(s) that provide the requested wireless application service(s) are already installed in wireless access point 104 (step 208). If not, WAN interface 114 of wireless access point 104 obtains the required application(s) from application server 108, which is specified by the vendor service access point in the wireless application service request (step 210). Processor 116 of wireless access point 104 then installs and executes the obtained application(s) in wireless access point 104 (step 212). Transmitter 120 of wireless access point 104 can then transmit a wireless application service request response to wireless client 102 (step 214). Processor 116 generates a packet representing the wireless application service request response, and transmitter 120 transmits a wireless signal representing the packet.

FIG. 6 shows the format of a wireless application service request response 600 according to some embodiments of the present invention. Wireless application service request response 600 begins with a six-byte destination address (DA) 602 that includes the address of wireless client 102, followed by a six-byte source address (SA) 604 that includes the address of wireless access point 104. Wireless application service request response 600 also includes a two-byte length field (Len.) 606, a 3-byte IEEE 802.2 Logical Link Control (LLC) portion including a one-byte field 608 comprising the value 0xAA, another one-byte field 610 comprising the value 0xAA, and a one-byte field 612 comprising the value 0x03, a three-byte WAP OUI 614 representing a manufacturer of wireless access point 104, a two-byte field 616 comprising a frame type (which can have a value of 0x8001 for a wireless application service request response 600), an identifier of a service access point for the wireless application service including a three-byte Vendor OUI 618 of a vendor of the application(s) that provides the requested wireless application service(s) and a two-byte vendor port number 620 of a port where the application is available, a variable length list 622 of one or more Tag Length Value (TLV) fields each representing one of the requested wireless application services, and a two-byte frame check sequence (FCS) 624. Other embodiments can include the same and/or different fields of the same or different lengths in the same or different order.

The TLV fields in TLV list 622 can have the same format as TLV field 500 of FIG. 5. Each TLV field in TLV list 622 can include information for one of the wireless application services specified in the TLV field(s) in the TLV list 422 of the corresponding wireless application service request 400.

In some embodiments, wireless client 102 must be authenticated before receiving a wireless application service. In some cases, the application can perform the authentication. In other cases, wireless access point 104 can perform the authentication for the application. In such cases, wireless access point 104 determines whether authentication is required (step 216). If so, wireless access point 104 challenges wireless client 102 (step 218). In response to the challenge, wireless client 102 transmits an authentication request to wireless access point 104 (step 220). In some embodiments, user interface 130 of wireless device 128 includes a fingerprint reader 134 or other authentication device to authenticate the user, for example before responding to the challenge.

FIG. 7 shows the format of an authentication request 700 according to some embodiments of the present invention. Authentication request 700 begins with a six-byte destination address (DA) 702 that includes the address of wireless access point 104, followed by a six-byte source address (SA) 704 that includes the address of wireless client 102. Authentication request 700 also includes a two-byte length field 706, a 3-byte IEEE 802.2 Logical Link Control (LLC) portion including a one-byte field 708 comprising the value 0xAA, another one-byte field 710 comprising the value 0xAA, and a one-byte field 712 comprising the value 0x03, a three-byte WAP OUI 714 representing a manufacturer of wireless access point 104, a two-byte field 716 comprising a frame type (which can have a value of 0x0002 for an authentication request 700), a three-byte Vendor OUI 718 representing a provider of the desired wireless application service, a two-byte vendor port number 720, a variable-length security certificate 722, and a two-byte FCS 724. Other embodiments can include the same and/or different fields of the same or different lengths in the same or different order.

Referring again to FIG. 2, wireless access point 104 attempts to authenticate wireless client 102 (step 222), for example using security certificate 722 of FIG. 7. Referring again to FIG. 2, wireless access point 104 then sends an authentication response to wireless client 102 (step 224).

FIG. 8 shows the format of an authentication response 800 according to some embodiments of the present invention. Authentication response 800 begins with a six-byte destination address (DA) 802 that includes the address of wireless client 102, followed by a six-byte source address (SA) 804 that includes the address of wireless access point 104. Authentication response 800 also includes a two-byte length field 806, a 3-byte IEEE 802.2 Logical Link Control (LLC) portion including a one-byte field 808 comprising the value 0xAA, another one-byte field 810 comprising the value 0xAA, and a one-byte field 812 comprising the value 0x03, a three-byte WAP OUI 814 representing a manufacturer of wireless access point 104, a two-byte field 816 comprising a frame type (which can have a value of 0x8002 for an authentication response 800), a three-byte Vendor OUI 818, a two-byte vendor port number 820, a variable-length authentication result 822 representing the success or failure of the authentication attempt, and a two-byte FCS 824. Other embodiments can include the same and/or different fields of the same or different lengths in the same or different order.

Referring again to FIG. 2, if the authentication was successful (step 224), the application(s), now executing on processor 116 of wireless access point 104, provides the requested wireless application service(s) to wireless client 102 (step 226).

As an example of the operation of embodiments of the present invention, consider the case where a consumer has purchased a wireless device 128 comprising a wireless client 102. User interface 130 includes an "easy configuration" button that, when pressed, initiates a configuration process such as process 200 of FIG. 2. When contacting application server 108, wireless access point 104 can register wireless device 128 with its vendor and obtain an application from the vendor to provide wireless application services to wireless device 128. For example, the wireless services can install firmware, upgrades and the like in wireless device 128.

Referring again to FIG. 1, applications providing wireless application services can use memory 118 of wireless access point 104 so that little storage is required in wireless device 128. In the example where wireless device 128 is a television remote control having a display screen, the application can obtain preview clips of television shows, store the clips in memory 118, and stream the clips to the remote control when needed.

Figure 9B:
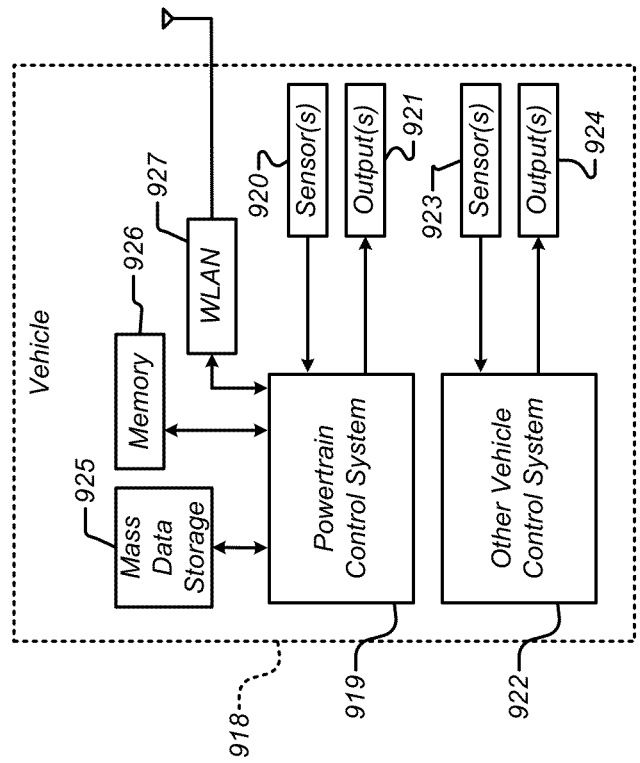
FIGS. 9A-9E show various exemplary implementations of the present invention.
Figure 9A:
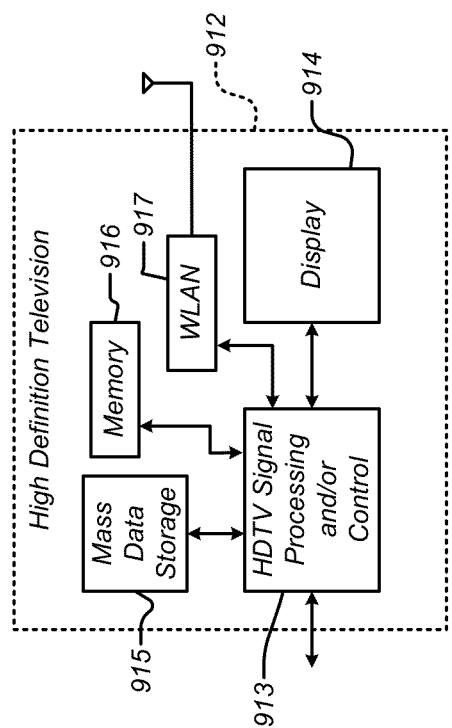

FIGS. 9A-9E show various exemplary implementations of the present invention. Referring now to FIG. 9A, the present invention can be implemented in a high definition television (HDTV) 912. The present invention may implement either or both signal processing and/or control circuits, which are generally identified in FIG. 9A at 913, a WLAN interface and/or mass data storage of the HDTV 912. The HDTV 912 receives HDTV input signals in either a wired or wireless format and generates HDTV output signals for a display 914. In some implementations, signal processing circuit and/or control circuit 913 and/or other circuits (not shown) of the HDTV 912 may process data, perform coding and/or encryption, perform calculations, format data and/or perform any other type of HDTV processing that may be required.

The HDTV 912 may communicate with mass data storage 915 that stores data in a nonvolatile manner such as optical and/or magnetic storage devices. The HDD may be a mini HDD that includes one or more platters having a diameter that is smaller than approximately 1.8". The HDTV 912 may be connected to memory 916 such as RAM, ROM, low latency nonvolatile memory such as flash memory and/or other suitable electronic data storage. The HDTV 912 also may support connections with a WLAN via a WLAN network interface 917.

Referring now to FIG. 9B, the present invention implements a control system of a vehicle 918, a WLAN interface and/or mass data storage of the vehicle control system. In some implementations, the present invention implements a powertrain control system 919 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 922 of the vehicle 918. The control system 922 may likewise receive signals from input sensors 923 and/or output control signals to one or more output devices 924. In some implementations, the control system 922 may be part of an anti-lock braking system (ABS), a navigation system, a telematics system, a vehicle telematics system, a lane departure system, an adaptive cruise control system, a vehicle entertainment system such as a stereo, DVD drive, compact disc system and the like. Still other implementations are contemplated.

The powertrain control system 919 may communicate with mass data storage 925 that stores data in a nonvolatile manner. The mass data storage 925 may include optical and/or magnetic storage devices including HDDs and/or DVD drives. The HDD may be a mini HDD that includes one or more platters having a diameter that is smaller than approximately 1.8". The powertrain control system 919 may be connected to memory 926 such as RAM, ROM, low latency nonvolatile memory such as flash memory and/or other suitable electronic data storage. The powertrain control system 919 also may support connections with a WLAN via a WLAN network interface 927. The control system 922 may also include mass data storage, memory and/or a WLAN interface (all not shown).

Figure 9C:
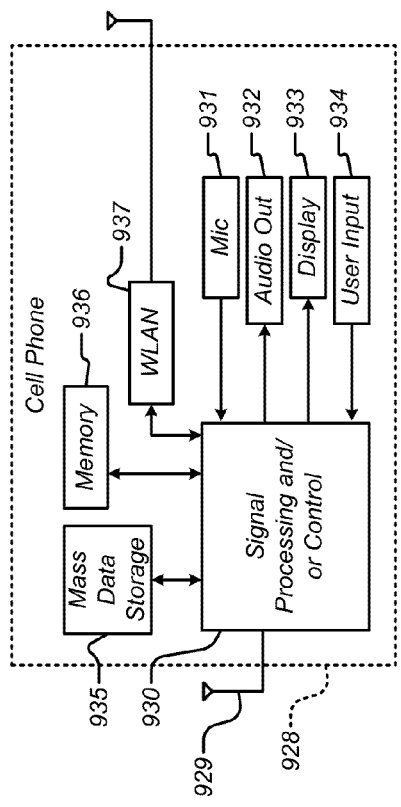

Referring now to FIG. 9C, the present invention can be implemented in a cellular phone 928 that may include a cellular antenna 929. The present invention may implement either or both signal processing and/or control circuits, which are generally identified in FIG. 9C at 930, a WLAN interface and/or mass data storage of the cellular phone 928. In some implementations, the cellular phone 928 includes a microphone 931, an audio output 932 such as a speaker and/or audio output jack, a display 933 and/or an input device 934 such as a keypad, pointing device, voice actuation and/or other input device. The signal processing and/or control circuits 930 and/or other circuits (not shown) in the cellular phone 928 may process data, perform coding and/or encryption, perform calculations, format data and/or perform other cellular phone functions.

The cellular phone 928 may communicate with mass data storage 935 that stores data in a nonvolatile manner such as optical and/or magnetic storage devices including HDDs and/or DVD drives. The HDD may be a mini HDD that includes one or more platters having a diameter that is smaller than approximately 1.8". The cellular phone 928 may be connected to memory 936 such as RAM, ROM, low latency nonvolatile memory such as flash memory and/or other suitable electronic data storage. The cellular phone 928 also may support connections with a WLAN via a WLAN network interface 937.

Figure 9D:
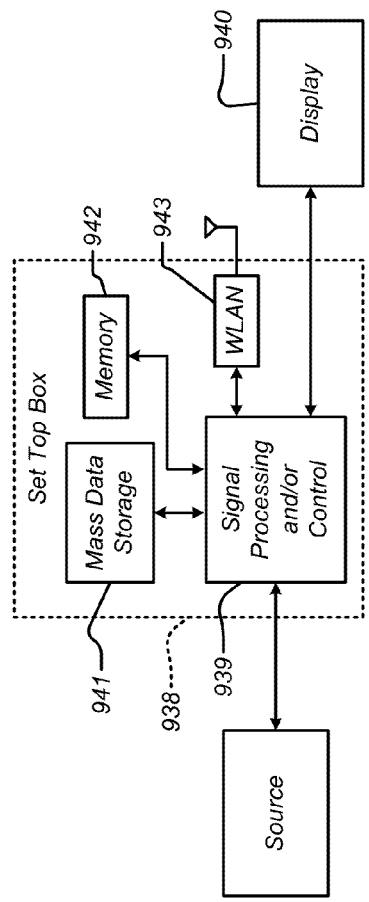

Referring now to FIG. 9D, the present invention can be implemented in a set top box 938. The present invention may implement either or both signal processing and/or control circuits, which are generally identified in FIG. 9D at 939, a WLAN interface and/or mass data storage of the set top box 938. The set top box 938 receives signals from a source such as a broadband source and/or outputs standard and/or high definition audio/video signals suitable for a display 940 such as a television, a monitor and/or other video and/or audio output devices. The signal processing and/or control circuits 939 and/or other circuits (not shown) of the set top box 938 may process data, perform coding and/or encryption, perform calculations, format data and/or perform any other set top box functions.

The set top box 938 may communicate with mass data storage 943 that stores data in a nonvolatile manner. The mass data storage 943 may include optical and/or magnetic storage devices including HDDs and/or DVD drives. The HDD may be a mini HDD that includes one or more platters having a diameter that is smaller than approximately 1.8". The set top box 938 may be connected to memory 942 such as RAM, ROM, low latency nonvolatile memory such as flash memory and/or other suitable electronic data storage. The set top box 938 also may support connections with a WLAN via a WLAN network interface 943.

Figure 9E:
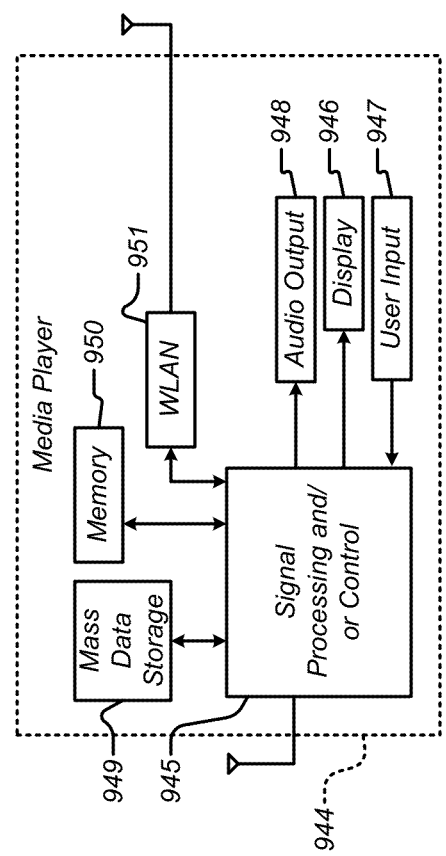

Referring now to FIG. 9E, the present invention can be implemented in a media player 944. The present invention may implement either or both signal processing and/or control circuits, which are generally identified in FIG. 9E at 945, a WLAN interface and/or mass data storage of the media player 944. In some implementations, the media player 944 includes a display 946 and/or a user input 947 such as a keypad, touchpad and the like. In some implementations, the media player 944 may employ a graphical user interface (GUI) that typically employs menus, drop down menus, icons and/or a point-and-click interface via the display 946 and/or user input 947. The media player 944 further includes an audio output 948 such as a speaker and/or audio output jack. The signal processing and/or control circuits 945 and/or other circuits (not shown) of the media player 944 may process data, perform coding and/or encryption, perform calculations, format data and/or perform any other media player functions.

The media player 944 may communicate with mass data storage 949 that stores data such as compressed audio and/or video content in a nonvolatile manner. In some implementations, the compressed audio files include files that are compliant with MP3 format or other suitable compressed audio and/or video formats. The mass data storage 949 may include optical and/or magnetic storage devices including HDDs and/or DVD drives. The HDD may be a mini HDD that includes one or more platters having a diameter that is smaller than approximately 1.8". The media player 944 may be connected to memory 950 such as RAM, ROM, low latency nonvolatile memory such as flash memory and/or other suitable electronic data storage. The media player 944 also may support connections with a WLAN via a WLAN network interface 951. Still other implementations in addition to those described above are contemplated.

A number of implementations of the invention have been described. Nevertheless, it will be understood that various modifications may be made without departing from the spirit and scope of the invention. Accordingly, other implementations are within the scope of the following claims.

What is claimed is:

1. A wireless client device comprising:
a receiver configured to wirelessly receive a beacon from a wireless access point, wherein the beacon includes an information element indicating whether the wireless access point is capable of providing a wireless application service;
a controller configured to, in response to the information element indicating that the wireless access point is capable of providing a wireless application service, generate a wireless application service request, wherein the wireless application service request
identifies a requested wireless application service, and identifies a source of an application to be obtained, installed, and executed by the wireless access point, wherein execution of the application by the wireless access point enables the wireless access point to provide the requested wireless application service to the wireless client device, and wherein the source of the application is separate from the wireless access point; and a transmitter configured to wirelessly transmit a packet to the wireless access point, wherein the packet includes the wireless application service request.

2. The wireless client device of claim 1, wherein the source of the application in the wireless application service request includes a unique identifier of a vendor of the application.

3. The wireless client device of claim 2, wherein the unique identifier is a 3-byte organizationally unique identifier (OUI).

4. The wireless client device of claim 2, wherein the source of the application in the wireless application service request further includes an identifier of a port at the vendor from which the application can be obtained.

5. The wireless client device of claim 4, wherein the identifier of the port is two bytes in length.

6. The wireless client device of claim 1, wherein the receiver is configured to wirelessly receive a wireless application service response from the wireless access point, wherein the wireless application service response identifies the requested wireless application service.

7. The wireless client device of claim 1, wherein the wireless application service request identifies a plurality of requested wireless application services including the requested wireless application service.

8. The wireless client device of claim 7, wherein the wireless application service request includes a variable-length list of identifiers of the plurality of requested wireless application services.

9. The wireless client device of claim 8, wherein the identifier of each of the plurality of requested wireless application services is transported in a tag-length-value field in the variable-length list.

10. The wireless client device of claim 1, wherein:
the receiver is configured to wirelessly receive an authentication challenge from the wireless access point,
the transmitter is configured to, in response to the authentication challenge being received by the receiver, wirelessly transmit an authentication request to the wireless access point,
the authentication request includes a security certificate, and
the requested wireless application service is available to the wireless client device only in response to the wireless access point determining that authentication was successful based on the security certificate.

11. A method of operating a wireless client device, the method comprising:
wirelessly receiving a beacon from a wireless access point, wherein the beacon includes an information element indicating whether the wireless access point is capable of providing a wireless application service;
in response to the information element indicating that the wireless access point is capable of providing a wireless application service, generating a wireless application service request, wherein the wireless application service request
identifies a requested wireless application service,
identifies a source of an application to be obtained, installed, and executed by the wireless access point, wherein execution of the application by the wireless access point enables the wireless access point to provide the requested wireless application service to the wireless client device, and wherein the source of the application is separate from the wireless access point; and
wirelessly transmitting a packet to the wireless access point, wherein the packet includes the wireless application service request.

12. The method of claim 11, wherein the source of the application in the wireless application service request includes a unique identifier of a vendor of the application.

13. The method of claim 12, wherein the unique identifier is a 3-byte organizationally unique identifier (OUI).

14. The method of claim 12, wherein the source of the application in the wireless application service request includes an identifier of a port at the vendor from which the application can be obtained.

15. The method of claim 14, wherein the identifier of the port is two bytes in length.

16. The method of claim 11, further comprising wirelessly receiving a wireless application service response from the wireless access point, wherein the wireless application service response identifies the requested wireless application service.

17. The method of claim 11, wherein the wireless application service request identifies a plurality of requested wireless application services including the requested wireless application service.

18. The method of claim 17, wherein the wireless application service request includes a variable-length list of identifiers of the plurality of requested wireless application services.

19. The method of claim 18, wherein the identifier of each of the plurality of requested wireless application services is transported in a tag-length-value field in the variable-length list.

20. The method of claim 11, further comprising:
wirelessly receiving an authentication challenge from the wireless access point; and
in response to the authentication challenge being received by the receiver, wirelessly transmitting an authentication request to the wireless access point,
wherein the authentication request includes a security certificate, and
wherein the requested wireless application service is available to the wireless client device only in response to the wireless access point determining authentication was successful based on the security certificate.

* * * * *